May 7, 1940. M. L. THOMPSON 2,199,530
MEASURING HARNESS
Filed Oct. 14, 1938 2 Sheets-Sheet 1

Inventor
Muriel L. Thompson
By Clarence A. O'Brien
and Hyman Berman
Attorneys

May 7, 1940.　　　　M. L. THOMPSON　　　　2,199,530
MEASURING HARNESS
Filed Oct. 14, 1938　　　2 Sheets-Sheet 2

Inventor
Muriel L. Thompson.
By Clarence A. O'Brien
and Hyman Berman
Attorneys

Patented May 7, 1940

2,199,530

UNITED STATES PATENT OFFICE 2,199,530

MEASURING HARNESS

Muriel L. Thompson, Bloomfield, N. J.

Application October 14, 1938, Serial No. 235,062

1 Claim. (Cl. 33—15)

My invention relates to improvements in measuring harness for dressmakers and the like.

The principal object of the invention is to provide a harness of this character which is equipped for quickly and accurately taking a wide variety of measurements in dressmaking and which is of such simplified arrangement that the amateur as well as the professional dressmaker may utilize the same to equal advantage.

To the accomplishment of the above, and subordinate objects presently appearing, a preferred embodiment of my invention has been illustrated in the accompanying drawings, set forth in detail in the succeeding description, and defined in the claim appended hereto.

Figure 1:
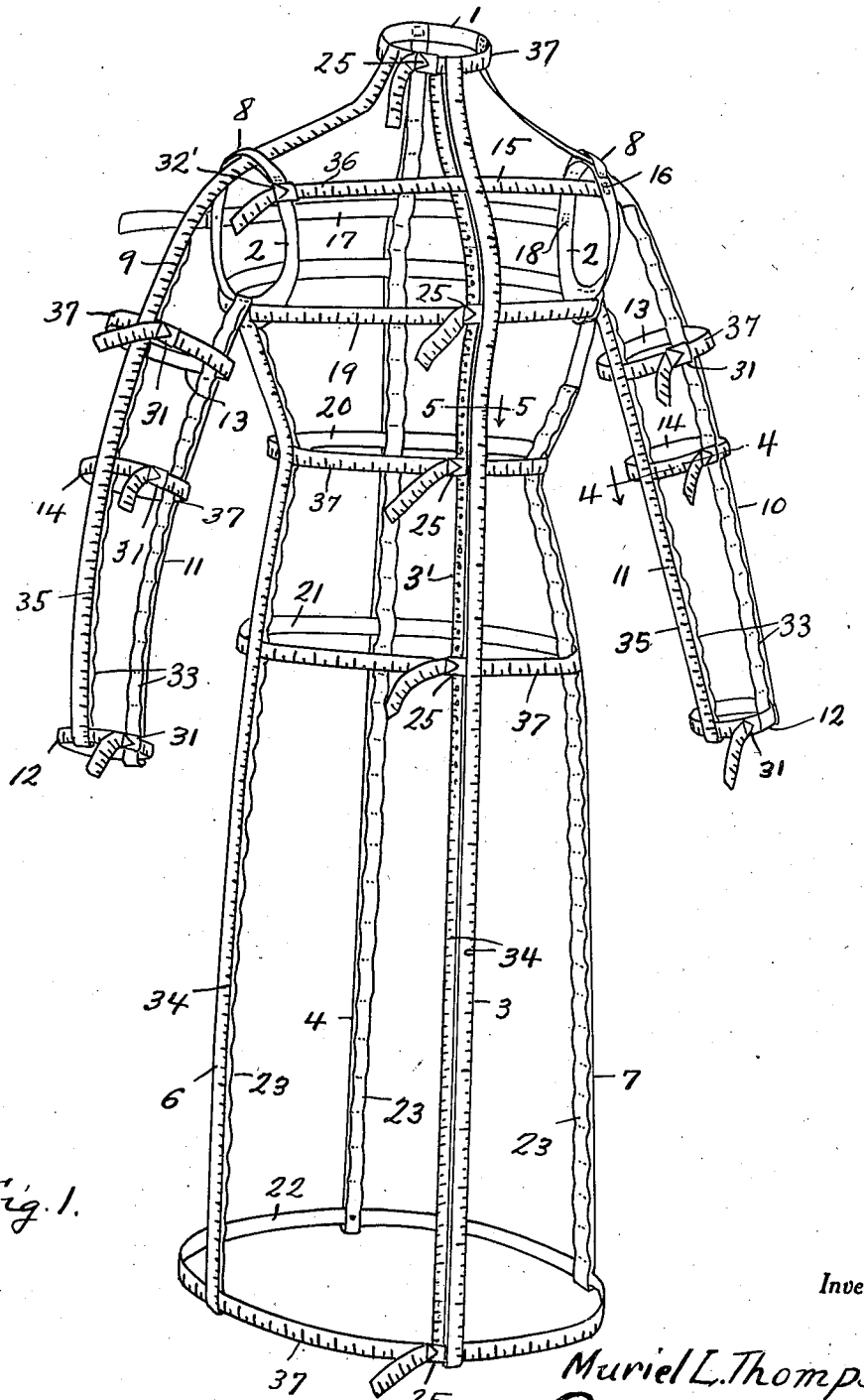
Figure 1 is a view in perspective of a preferred embodiment of my improved harness.
Figure 2:
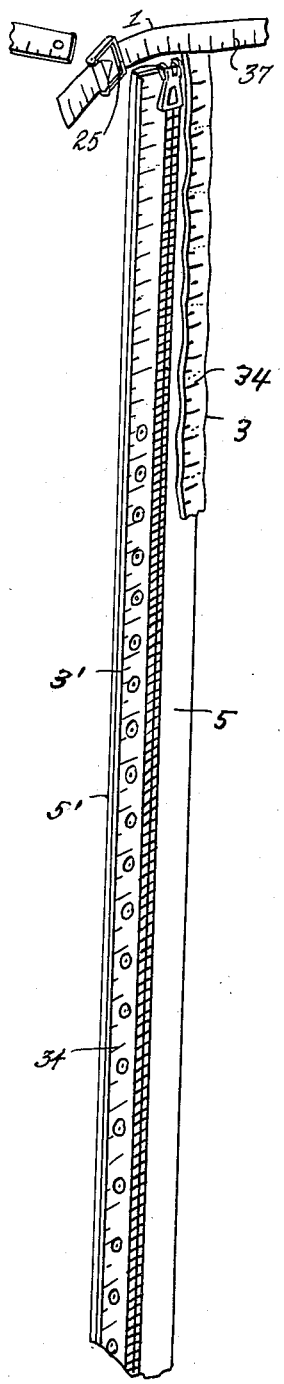
Figure 2 is a fragmentary view in perspective drawn to an enlarged scale and illustrating the combination front tape and zipper fastener.
Figure 3:
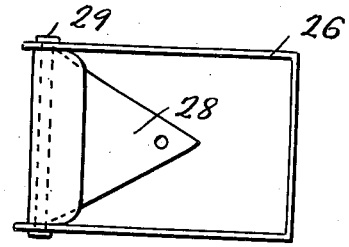
Figure 3 is a view in rear elevation of one of the slide buckles.
Figure 4:
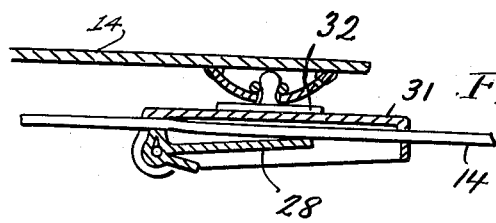
Figure 4 is a detail view in longitudinal section taken through one of the arm straps on the line 4—4 of Figure 1 and drawn to an enlarged scale looking in the direction indicated by the arrows.

Referring to the drawings by numerals, in the illustrated embodiment thereof the harness of my invention comprises a neck band 1, and armhole bands 2, the former having suspended from the front and rear thereof a pair of front measuring tapes 3, 3' and a rear measuring tape 4. The front tapes 3, 3' have suitably secured to the rear side thereof zipper sections 5 and 5' extending from the upper to the lower ends of said tapes. A pair of right and left side tapes 6 and 7 are suitably secured at upper ends thereof to the bottoms of the armhole bands 2, respectively. Extending from the opposite sides of the neck band 1 through loops 8 in the upper side of said armhole bands 2 and with upper ends suitably secured to said neck band 1 is a pair of tapes 9 and 10 functioning as shoulder and outside arm tapes for shoulder and outside sleeve measurements. A pair of inside arm tapes 11 depend from the bottom of the armhole bands 2, respectively, with the upper ends suitably secured to said bands 2 and for taking measurements of the inner sides of the sleeve. The free ends of the tapes 9 and 11 on the one hand and 10 and 11 on the other hand for each sleeve are connected together by a lower wrist band 12, an upper arm girth band 13 and an intermediate elbow band 14. A chest measuring tape 15 is secured, as at 16, at one end to the upper front part of one armhole band 2 for variable connection of its other end to a similar portion of the other armhole band. A back measuring tape 17 is similarly secured, as at 18, to the rear side of one armhole band 2 also for variable connection of its other end to the rear side of the other band 2. The variable connection for the chest and back measuring tapes 15 and 17 will presently be described.

Figure 5:
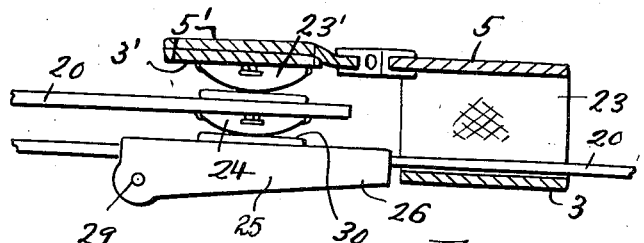
Figure 5 is a similar view taken through the combination front tape and zipper on the line 5—5 looking in the direction indicated by the arrows.
Figure 6:
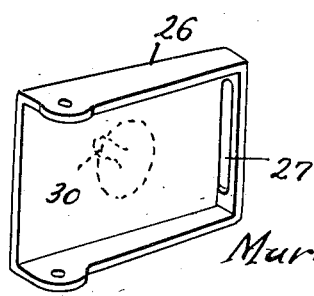
Figure 6 is a view in perspective of the rear clamping plate of one of the slide buckles.

Below the tapes 15 and 17 is a series of bust, waist, hip, and skirt bottom bands 19, 20, 21, and 22, respectively, each of which is inserted loosely through loops 23 provided on the inner sides of the tapes 4, 6 and 7 and one tape 3 in longitudinally spaced relation throughout the entire length of the same. One end of each of said bands 19, 20, 21 and 22 is detachably secured to the other tape 3', as by a glove fastener 23', one of which is shown in Figure 5, and said end is provided with a glove fastener member 24. The free end of each band 19, 20, 21 and 22 is provided with a slide buckle 25 including a back clamping slide 26 having a slotted end 27 through which the band is threaded, a front clamping member 28, pivoted, as at 29, to the back plate for swinging movement thereon into and from clamping relation thereto, and a glove fastener member 30 on the back of the back plate for cooperation with the glove fastener member 24 to variably connect the free end of the band to the zipper section 5'.

The neck, wrist, girth and elbow bands 1, 12, 13 and 14 are equipped for variable connection of the ends thereof by means of a slide buckle 31 similar to buckles 25 and glove fastener members 32 on one end of the band and on said buckle. The bands 12, 13 and 14 are slidably connected to the related tapes 9 and 11, or 10 and 11, as the case may be, by longitudinally spaced loops 33 on the inner side of said tapes. The variable connection between the free ends of the chest and back measuring tapes 15 and 17 and the armhole band 2 is the same as described with reference to the bands 1, 12, 13 and 14 and as indicated at 32'.

The various tapes 3, 3', 4, 6 and 7 are graduated in inches, as at 34, and the loops 23 spaced in inches so that the bands 19, 20, 21 and 22 may be threaded through said loops to space the same along said tapes at selected graduations determining bust, waist, hip and bottom skirt measurements. The tapes 9, 10 and 11 are similarly graduated, as at 35, and the loops 33 are similarly spaced thereon for selectively spacing the bands 12, 13 and 14 along said tapes in determining longitudinal sleeve measurements in inches. The tapes 15 and 17 are similarly graduated, as at 36, for sliding the connections 32' along the same to take chest and back measurements. Lastly the bands 1, 12, 13, 14, 20, 21 and 22 are also similarly graduated, as at 37, for taking up or letting out in inches in circumferentially measuring the neck, arms, waist, and other parts as the case may be.

As will be seen, in the instance of each band or strap equipped with a buckle 25, 31 the buckle may be set along the free end of the band into any desired inch position before attaching to the glove fastener member 24, thereby functioning as a marker for designating the measurement before fastening.

As will also be clear, by opening the zipper sections 5 and 5', the harness may be taken off with all bands secured in selected measuring position on the related tapes and with the selected measurements indicated thereon.

The foregoing will, it is believed, suffice to impart a clear understanding of my invention without further explanation.

Manifestly the invention, as described, is susceptible of modification without departing from the inventive concept and right is herein reserved to such modifications as fall fairly within the scope of the subjoined claim.

What I claim is:

Measuring harness for dressmakers comprising a collar band, a pair of strip-like zipper sections one attached to and depending from the front side of said band, and each comprising a measuring tape, a back measuring tape depending from the rear side of said collar band, a pair of armhole bands, a pair of right and left side measuring tapes depending from the under side of said armhole bands, respectively, and a plurality of graduated bust, waist and bottom skirt bands, respectively, mounted on said tapes and having slide buckles thereon for variably connecting the ends thereof together, said plurality of bands being detachably attached at one end to one of the tapes of said pair, and coacting snap action devices on the attached ends of said plurality of bands and the slide buckles of said bands for attaching said buckles to said ends of the bands.

MURIEL L. THOMPSON.